United States Patent
Malladi

(10) Patent No.: US 8,570,982 B2
(45) Date of Patent: Oct. 29, 2013

(54) TRANSMIT SPATIAL DIVERSITY FOR CELLULAR SINGLE FREQUENCY NETWORKS

(75) Inventor: Durga Prasad Malladi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 280 days.

(21) Appl. No.: 12/873,551

(22) Filed: Sep. 1, 2010

(65) Prior Publication Data

US 2010/0322350 A1 Dec. 23, 2010

Related U.S. Application Data

(63) Continuation of application No. 11/450,229, filed on Jun. 8, 2006, now Pat. No. 8,059,608.

(60) Provisional application No. 60/690,622, filed on Jun. 14, 2005.

(51) Int. Cl.
*H04W 4/00* (2009.01)

(52) U.S. Cl.
USPC ..... 370/334; 455/101; 455/575.7; 455/562.1; 455/63.1; 455/114.2; 370/328; 370/338; 370/458; 370/344

(58) Field of Classification Search
USPC .............. 455/101, 575.7, 562.1, 63.1, 114.2; 370/328, 338, 458, 344, 334
See application file for complete search history.

(56) References Cited

U.S. PATENT DOCUMENTS

| 6,504,837 | B1 | 1/2003 | Menzel |
| 7,194,042 | B2 | 3/2007 | Walton et al. |
| 8,059,608 | B2 | 11/2011 | Malladi |

(Continued)

FOREIGN PATENT DOCUMENTS

| GB | 2408172 | 5/2005 |
| JP | 2001057528 A | 2/2001 |

(Continued)

OTHER PUBLICATIONS

Foschini G.J: "Layered Space-Time Architecture for Wireless Communication in a Fading Environment When Using Multi-Element Antenna", Bell Labs Technical Journal, vol. 1, No. 2, pp. 41-59, Sep. 21, 2006, XP000656005.

(Continued)

*Primary Examiner* — Kwasi Karikari
(74) *Attorney, Agent, or Firm* — Eric Ho

(57) ABSTRACT

Multiple-In Multiple-Out (MIMO) techniques are used to increase spectral efficiency of a cellular single frequency network. In some embodiments with single transmit antenna per cell, multiple data streams are transmitted from multiple cells, one data stream per set of transmit antennae. The mapping of streams to antenna sets is permuted in time. In this way, user equipment devices (UEs) at cell edges benefit from MIMO, and UEs near cell centers benefit from high carrier-to-interference (C/I) ratio of the signal. In some embodiments, each stream is concurrently transmitted on base layer of a hierarchically modulated signal from one set, and on enhancement layer of a hierarchically modulated signal from another set. The mapping of sets to streams is permuted in time. The UEs at cell edges benefit from MIMO, and the UEs near cell centers benefit from the high C/I to decode both streams from the base and enhancement layers.

40 Claims, 5 Drawing Sheets

(56) References Cited

U.S. PATENT DOCUMENTS

| | | | |
|---|---|---|---|
| 2002/0142723 A1 | 10/2002 | Foschini et al. | |
| 2003/0066004 A1 | 4/2003 | Rudrapatna et al. | |
| 2003/0154435 A1 | 8/2003 | Claussen et al. | |
| 2004/0052235 A1 | 3/2004 | Foschini | |
| 2004/0066866 A1 | 4/2004 | Tong et al. | |
| 2004/0072594 A1 | 4/2004 | Hwang et al. | |
| 2005/0063339 A1 | 3/2005 | Jeong et al. | |
| 2005/0068918 A1* | 3/2005 | Mantravadi et al. | 370/328 |
| 2005/0085195 A1 | 4/2005 | Tong et al. | |
| 2005/0148311 A1* | 7/2005 | Anderson | 455/277.2 |
| 2005/0175115 A1 | 8/2005 | Walton et al. | |
| 2005/0195763 A1 | 9/2005 | Kadous et al. | |
| 2005/0266902 A1 | 12/2005 | Khatri et al. | |
| 2005/0287962 A1 | 12/2005 | Mehta et al. | |
| 2006/0114813 A1 | 6/2006 | Seki et al. | |
| 2007/0274253 A1* | 11/2007 | Zhang et al. | 370/328 |

FOREIGN PATENT DOCUMENTS

| | | |
|---|---|---|
| JP | 2003023381 | 1/2003 |
| WO | WO 0049730 | 8/2000 |
| WO | WO 03075470 A2 | 9/2003 |
| WO | 2005004376 A1 | 1/2005 |
| WO | WO 2005048484 A1 | 5/2005 |

OTHER PUBLICATIONS

International Search Report—PCT/US06/022725—International Search Authority, European Patent Office—Nov. 8, 2006.

Written Opinion—PCT/US06/022725—International Search Authority, European Patent Office—Nov. 8, 2006.

European Search Report—EP10168349—Search Authority—Munich—Jul. 16, 2012.

* cited by examiner

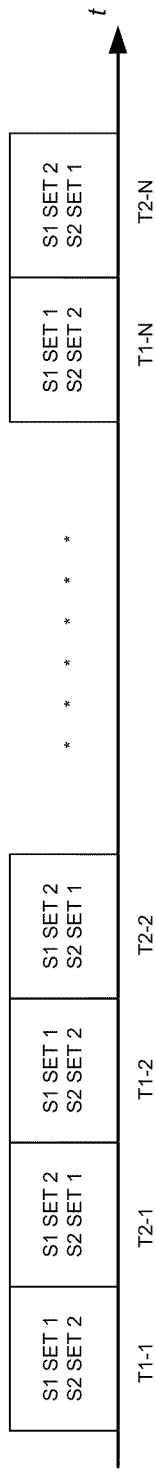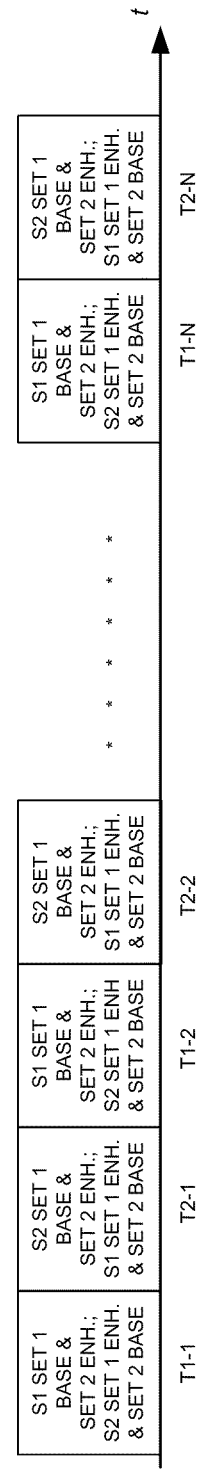

US 8,570,982 B2

TRANSMIT SPATIAL DIVERSITY FOR CELLULAR SINGLE FREQUENCY NETWORKS

CLAIM OF PRIORITY UNDER 35 U.S.C. §120

The present application for patent is a continuation of patent application Ser. No. 11/450,229, entitled, "Transmit Spatial Diversity For Cellular Single Frequency Networks", filed on Jun. 8, 2006, currently pending, which claims priority to Provisional Application Ser. No. 60/690,622, entitled, "Transmit Diversity For E-MBMS", filed on Jun. 14, 2005; now expired and assigned to the assignee hereof and hereby expressly incorporated by reference herein.

BACKGROUND

1. Field

The present invention relates generally to telecommunications, and, more specifically, to methods, apparatus, and articles of manufacture for broadcasting and multicasting from a cellular radio network.

2. Background

A modern communication system is expected to provide reliable data transmission for a variety of applications, including voice and data applications. In a point-to-multipoint communications context, known communication systems are based on frequency division multiple access (FDMA), time division multiple access (TDMA), code division multiple access (CDMA), and perhaps other multiple access communication schemes.

A CDMA system may be designed to support one or more CDMA standards, such as (1) the "TIA/EIA-95 Mobile Station-Base Station Compatibility Standard for Dual-Mode Wideband Spread Spectrum Cellular System" (this standard with its enhanced revisions A and B may be referred to as the "IS-95 standard"), (2) the "TIA/EIA-98-C Recommended Minimum Standard for Dual-Mode Wideband Spread Spectrum Cellular Mobile Station," also known as the "IS-98 standard," (3) the standard sponsored by a consortium named "3rd Generation Partnership Project" (3GPP) and embodied in a set of documents including documents known as 3G TS 25.211, 3G TS 25.212, 3G TS 25.213, and 3G TS 25.214 (the "W-CDMA standard"), (4) the standard sponsored by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," (the "cdma2000 standard" collectively), (5) the 1xEV-DO standard "TIA/EIA/IS-856 cdma2000 High Rate Packet Data Air Interface Specification," and (6) certain other standards. The standards listed above are incorporated by reference as if fully set forth herein, including annexes, appendices, and other attachments.

Manufacturers continue to add performance-enhancing features to wireless user equipment (UE) devices for use with cellular radio networks, such as cellular telephones. For example, many UEs include display screens with sufficient resolution to render video presentations.

With the enhanced capabilities of their UEs, users become more interested in being able to receive television broadcasts. Where there is demand, supply is likely to follow. Notably, cellular infrastructure for transmitting to UEs is already available. Operators of cellular networks thus would benefit from providing broadcast or multicast services to their subscribers. Live television, movies, sport clips, talk shows—all can be broadcast or multicast from a cellular radio network, in addition to more conventional services provided by such networks. This can be, in effect, similar to providing cable or satellite channels directly to the UEs.

Multimedia Broadcast Multicast Service (MBMS) is a broadcasting service that can be offered via existing Global System for Mobile Communications (GSM) and Universal Mobile Telecommunications System (UMTS) cellular networks. MBMS and its enhanced version, E-MBMS, are being standardized in various groups of 3GPP (Third Generation Partnership Project).

Downlink (DL) capacity is an important performance characteristic of cellular systems. Increased downlink capacity can be used, for example, to make more broadcast/multicast channels available to the subscribers, and to improve the quality of the broadcast transmissions. For a fixed frequency range available for cellular system transmissions, capacity depends on spectral efficiency. Given limited availability of electromagnetic spectrum, it is therefore desirable to increase spectral efficiency of cellular systems, including spectral efficiency of broadcasts and multicasts. To avoid costs associated with infrastructure updating, it is desirable to increase spectral efficiency of existing infrastructure without or with limited changes.

Many base transceiver stations (BTSs) of existing cellular radio network sites (Nodes-B) have a single transmit antenna for single frequency network (SFN) operation. There is therefore a need in the art for methods and apparatus that increase SFN broadcast and multicast spectral efficiency of cellular networks without requiring installation of multiple antennae at existing cellular sites.

SUMMARY

Embodiments disclosed herein address the above stated needs by providing a method for transmitting data from a plurality of sectors in a cellular communication system. The method includes assigning at least one transmit antenna from each sector of the plurality of sectors to a transmit antenna set of a plurality of L (L being an integer greater than 1) transmit antenna sets. Each transmit antenna set includes at least one transmit antenna of the cellular communication system. The method also includes arranging the data into a plurality of L data streams (e.g., partitioning into the streams, or keeping the streams separate). During at least one first period, each data stream is assigned to a different transmit antenna set of the L transmit antenna sets, resulting in a first distribution of data streams among transmit antenna sets. The method also includes, for each transmit antenna set of the plurality of L transmit antenna sets, modulating during the at least one first period a carrier of a first frequency with the data stream assigned to the transmit antenna set during the at least one first period. The method further includes transmitting to a plurality of receivers during the at least one first period the carrier through the transmit antennae of the plurality of L transmit antenna sets so that transmit antennae of each antenna set transmit during the at least one first period the data stream assigned to each transmit antenna set for the at least one first period.

In an embodiment, a cellular communication system includes a radio network controller and a plurality of sectors. Each sector has at least one transmit antenna and at least one base transceiver station. The radio network controller is configured to perform the following operations:

1. Assigning at least one transmit antenna from each sector of the plurality of sectors to a transmit antenna set of a plurality of L (L being an integer greater than 1) transmit antenna sets, so that each transmit antenna set of the plurality of L transmit antenna sets has at least one transmit antenna of the cellular communication system;

2. Arranging data into a plurality of L data streams;

3. Assigning, for at least one first period, each data stream to a different transmit antenna set of the L transmit antenna sets;

4. For each transmit antenna set of the plurality of L transmit antenna sets, causing the plurality of sectors to modulate, during the at least one first period, a carrier of a first frequency with the data stream assigned to each transmit antenna set during the at least one first period; and 5. Causing the plurality of sectors to transmit to a plurality of receivers during the at least one first period the carrier through the transmit antennae of the plurality of L transmit antenna sets so that transmit antennae of each transmit antenna set transmit during the at least one first period the data stream assigned to each transmit antenna set for the at least one first period.

In an embodiment, machine-readable medium stores instructions for a processor of a radio network controller for a cellular communication system that has a plurality of sectors with transmit antennae. When executed by the processor, the instructions configure the radio network controller to perform these operations:

1. Assigning at least one transmit antenna from each sector of the plurality of sectors to a transmit antenna set of a plurality of L (L being an integer greater than 1) transmit antenna sets, each transmit antenna set having at least one transmit antenna of the cellular communication system;

2. Arranging data into a plurality of L data streams;

3. Assigning, for at least one first period, each data stream to a different transmit antenna set of the L transmit antenna sets;

4. For each transmit antenna set of the plurality of L transmit antenna sets, causing the plurality of sectors to modulate, for the at least one first period, a carrier of a first frequency with the data stream assigned to each transmit antenna set during the at least one first period; and 5. Causing the plurality of sectors to transmit to a plurality of receivers during the at least one first period the carrier through the transmit antennae of the plurality of L transmit antenna sets so that transmit antennae of each transmit antenna set transmit during the at least one first period the data stream assigned to each transmit antenna set for the at least one first period.

In an embodiment, a method is provided for transmitting data from a plurality of sectors in a cellular communication system. The method includes the following steps:

1. Assigning at least one transmit antenna of each sector into a first transmit antenna set or a second transmit antenna set, each antenna set of the first and second transmit antenna sets having at least one transmit antenna;

2. Arranging the data into a first data stream and a second data stream;

3. Hierarchically modulating a carrier of a given frequency to obtain a first signal having a first base layer and a first enhancement layer;

4. Hierarchically modulating the carrier to obtain a second signal having a second base layer and a second enhancement layer;

5. Transmitting the first signal through each transmit antenna in the first transmit antenna set; and 6. Transmitting the second signal through each antenna in the second transmit antenna set.

In this method, the steps of hierarchically modulating are performed so that the first base layer carries information of the first data stream, the first enhancement layer carries information of the second data stream, the second base layer carries information of the second data stream, and the second enhancement layer carries information of the first data stream.

In an embodiment, a cellular communication system has a radio network controller and a plurality of sectors. Each sector has at least one transmit antenna. The radio network controller is configured to perform the following operations:

1. Assigning the at least one transmit antenna of each sector of the plurality of sectors into a first transmit antenna set or a second transmit antenna set, each antenna set of the first and second transmit antenna sets including at least one transmit antenna;

2. Arranging data into a first data stream and a second data stream;

3. Causing hierarchical modulation of a carrier of a given frequency to obtain a first signal having a first base layer and a first enhancement layer (for example, sending commands to perform such modulation to appropriate sectors);

4. Causing hierarchical modulation of the carrier to obtain a second signal having a second base layer and a second enhancement layer (for example, sending commands to perform such modulation to appropriate sectors);

5. Causing transmission of the first signal through each transmit antenna in the first transmit antenna set (for example, sending commands to perform such transmission to appropriate sectors); and 6. Causing transmission of the second signal through each transmit antenna the second transmit antenna set (for example, sending commands to perform such transmission to appropriate sectors);

In this system, the first base layer carries information of the first data stream, the first enhancement layer carries information of the second data stream, the second base layer carries information of the second data stream, and the second enhancement layer carries information of the first data stream.

In an embodiment, machine-readable medium stores instructions for at least one processor of a radio network controller for a cellular communication system. The cellular communication system includes a plurality of sectors, each sector having at least one transmit antenna. When executed by the at least one processor, the instructions configure the radio network controller to perform the following operations:

1. Assigning at least one transmit antenna of each sector into a first transmit antenna set or a second transmit antenna set, each transmit antenna set including at least one transmit antenna;

2. Arranging data into a first data stream and a second data stream;

3. Causing hierarchical modulation of a carrier of a given frequency to obtain a first signal having a first base layer and a first enhancement layer;

4. Causing hierarchical modulation of the carrier to obtain a second signal having a second base layer and a second enhancement layer;

5. Causing transmission of the first signal through each transmit antenna in the first transmit antenna set; and 6. Causing transmission of the second signal through each transmit antenna the second transmit antenna set.

In this embodiment, the first base layer carries information of the first data stream, the first enhancement layer carries information of the second data stream, the second base layer carries information of the second data stream, and the second enhancement layer carries information of the first data stream.

In an embodiment, a method is provided for transmitting data from a plurality of sectors in a cellular communication system in which each of the sectors has at least one transmit antenna. The method includes these steps:

1. Arranging the data into a plurality of data streams;
2. Modulating a carrier of a given frequency with the plurality of data streams to obtain a first signal and a second signal for broadcasting the data from the plurality of sectors using a multiple in multiple out (MIMO) spatial diversity technique;
3. Transmitting the first signal from each sector of a first set of sectors of the cellular communication system; and
4. Transmitting the second signal from each sector of a second set of sectors of the cellular communication system.

In an embodiment, a cellular radio network has a radio network controller and a plurality of cells. Each cell has at least one transmit antenna. The radio network controller is configured to perform the following operations:

1. Arranging data into a plurality of data streams;
2. Causing the plurality of cells to modulate a carrier of a given frequency with the plurality of data streams to obtain a first signal and a second signal for broadcasting the data from the plurality of cells using a multiple in multiple out (MIMO) spatial diversity technique;
3. Causing the plurality of cells to transmit the first signal from each cell of a first set of cells of the cellular communication system; and
4. Causing the plurality of cells to transmit the second signal from each cell of a second set of cells of the cellular communication system.

In an embodiment, a machine-readable medium stores instructions for at least one processor of a radio network controller of a cellular radio network. The cellular radio network has a plurality of cells, each cell with at least one transmit antenna. When executed by the at least one processor, the instructions configure the radio network controller to perform the following operations:

1. Arranging data into a plurality of data streams;
2. Causing the plurality of cells to modulate a carrier of a given frequency with the plurality of data streams to obtain a first signal and a second signal for broadcasting the data from the plurality of cells using a multiple in multiple out (MIMO) spatial diversity technique;
3. Causing the plurality of cells to transmit the first signal from each cell of a first set of cells of the cellular communication system; and
4. Causing the plurality of cells to transmit the second signal from each cell of a second set of cells of the cellular communication system.

In an embodiment, a method is provided for receiving data sent from a cellular communication system. The method includes receiving at a first antenna a first signal during one or more first time periods. The first signal is carried on a first frequency and contains a first data stream transmitted through a first physical channel, and a second data stream transmitted through a second physical channel. The first data stream has first data during the one or more first time periods, and the second data stream has second data during the one or more first time periods. The method also includes receiving at a second antenna a second signal during the one or more first time periods. The second signal is also carried on the first frequency. The second signal contains the first data stream transmitted through a third physical channel, and the second data stream transmitted through a fourth physical channel. The method also includes estimating the first, second, third, and fourth physical channels to obtain first, second, third, and fourth channel estimates. The method also includes separating the first and second data streams from at least one of the first signal and the second signal using the channel estimates.

In an embodiment, a wireless user equipment device for communicating with a base transceiver station of a cellular communication system includes first and second antennae, a receiver coupled to the antennae, a memory storing program code, and a processor coupled to the receiver and to the memory. The receiver is configured to receive at the first antenna a first signal during one or more first time periods. The first signal is carried on a first frequency, and contains a first data stream transmitted through a first physical channel and a second data stream transmitted through a second physical channel. The first data stream carries first data during the one or more first time periods, and the second data stream carries second data during the one or more first time periods. The receiver is also configured to receive at the second antenna a second signal during the one or more first time periods. The second signal is also being carried on the first frequency. The second signal contains the first data stream transmitted through a third physical channel, and the second data stream transmitted through a fourth physical channel. The processor is configured to estimate the first, second, third, and fourth physical channels to obtain channel estimates, and to separate the first and second data streams from at least one of the first signal and the second signal using the channel estimates.

In an embodiment, a machine-readable medium stores instructions for a processor of a wireless user equipment device for communicating with a cellular communication system. When the instructions are executed by the processor, they cause the wireless user equipment device to receive from the cellular communication system at a first antenna a first signal during one or more first time periods. The first signal is carried on a first frequency and contains a first data stream transmitted through a first physical channel, and a second data stream transmitted through a second physical channel. The first data stream carries first data during the one or more first time periods, and the second data stream carries second data during the one or more first time periods. The instructions further cause the wireless user equipment device to receive from the cellular communication system at a second antenna a second signal during the one or more first time periods. The second signal is also carried on the first frequency. The second signal contains the first data stream transmitted through a third physical channel, and the second data stream transmitted through a fourth physical channel. The instructions further cause the wireless user equipment device to estimate the first, second, third, and fourth physical channels to obtain channel estimates, and separate the first and second data streams from at least one of the first signal and the second signal using the channel estimates.

In an embodiment, a method is provided for receiving data sent from a cellular communication system. The method includes receiving at a first antenna a first signal. The first signal contains a first signal component transmitted through a first physical channel, and a second signal component transmitted through a second physical channel. The first signal component has a first base layer carrying a first data stream and a first enhancement layer carrying a second data stream. The second signal component contains a second base layer carrying the second data stream, and a second enhancement layer carrying the first data stream. The method also includes receiving at a second antenna a second signal. The second signal contains a third signal component transmitted through a third physical channel and a fourth signal component transmitted through a fourth physical channel. The third signal component has a third base layer carrying the first data stream, and a third enhancement layer carrying the second data stream. The fourth signal component has a fourth base layer carrying the second data stream, and a fourth enhancement layer carrying the first data stream. The method also includes estimating the first, second, third, and fourth physical channels to obtain one or more channel estimates, and separating the first and second signal components using the channel estimates. After separating, the first data stream is decoded from the first base layer, and the second data stream is decoded from at least one of the first enhancement layer and the second base layer. Note that the first, second, third, and fourth signal components are hierarchically modulated using the same carrier frequency.

In an embodiment, a wireless user equipment device for communicating with a base transceiver station of a radio network includes first and second receive antennae, a receiver, a memory storing program code, and a processor coupled to the receiver and to the memory. The receiver is configured to receive at the first antenna a first signal, and to receive at the second antenna a second signal. The first signal contains a first signal component transmitted through a first physical channel, and a second signal component transmitted through a second physical channel. The first signal component has a first base layer carrying a first data stream, and a first enhancement layer carrying a second data stream. The second signal component has a second base layer carrying the second data stream, and a second enhancement layer carrying the first data stream. The second signal contains a third signal component transmitted through a third physical channel, and a fourth signal component transmitted through a fourth physical channel. The third signal component has a third base layer carrying the first data stream, and a third enhancement layer carrying the second data stream. The fourth signal component has a fourth base layer carrying the second data stream, and a fourth enhancement layer carrying the first data stream. The first, second, third, and fourth signal components are hierarchically modulated using the same carrier frequency. The processor is configured to estimate the first, second, third, and fourth physical channels to obtain channel estimates, and to separate the first and second signal components using the channel estimates. The processor is further configured to decode, after separating, the first data stream from the first base layer, and the second data stream from the first enhancement layer and/or the second base layer.

In an embodiment, a machine-readable medium stores instructions for a processor of a wireless user equipment device. When executed by the processor, the instructions cause the wireless user equipment device to receive at a first antenna a first signal, and receive at a second antenna a second signal. The first signal contains a first signal component transmitted through a first physical channel, and a second signal component transmitted through a second physical channel. The first signal component has a first base layer carrying a first data stream, and a first enhancement layer carrying a second data stream. The second signal component has a second base layer carrying the second data stream, and a second enhancement layer carrying the first data stream. The second signal contains a third signal component transmitted through a third physical channel, and a fourth signal component transmitted through a fourth physical channel. The third signal component has a third base layer carrying the first data stream, and a third enhancement layer carrying the second data stream. The fourth signal component has a fourth base layer carrying the second data stream, and a fourth enhancement layer carrying the first data stream. The first, second, third, and fourth signal components are hierarchically modulated using the same carrier frequency. The instructions further cause the wireless user equipment device to estimate the first, second, third, and fourth physical channels to obtain channel estimates, and to separate the first and second signal components using the channel estimates. After separating, the instructions cause the wireless user equipment device to decode the first data stream from the first base layer, and to decode the second data stream from the first enhancement layer and/or the second base layer.

In an embodiment, a method is provided for operating a cellular radio network with first and second spatially diverse transmit antennae in a first cell. (The antennae are spatially diverse to enable MIMO.) The method includes transmitting (e.g., broadcasting, multicasting) a first data stream on a first frequency through the first antenna to a plurality of user equipment devices in communication with the network. The method also includes transmitting a second data stream on the first frequency through the second antenna to the plurality of user equipment devices. At least some of the user equipment devices have multiple spatially diverse receive antennae. In this way, the use of multiple transmit and multiple receive antennae enables increased spectral efficiency of the transmissions.

These and other embodiments and aspects of the present invention will be better understood with reference to the following description, drawings, and appended claims.

BRIEF DESCRIPTION OF THE DRAWINGS

FIG. 5 is a diagram illustrating time division multiplexing/permuting in the network of FIG. 4, in accordance with an embodiment of the present invention;

FIG. 7 is a diagram illustrating time division multiplexing/permuting in the network of FIG. 6, in accordance with an embodiment of the present invention.

DETAILED DESCRIPTION

Figure 1:
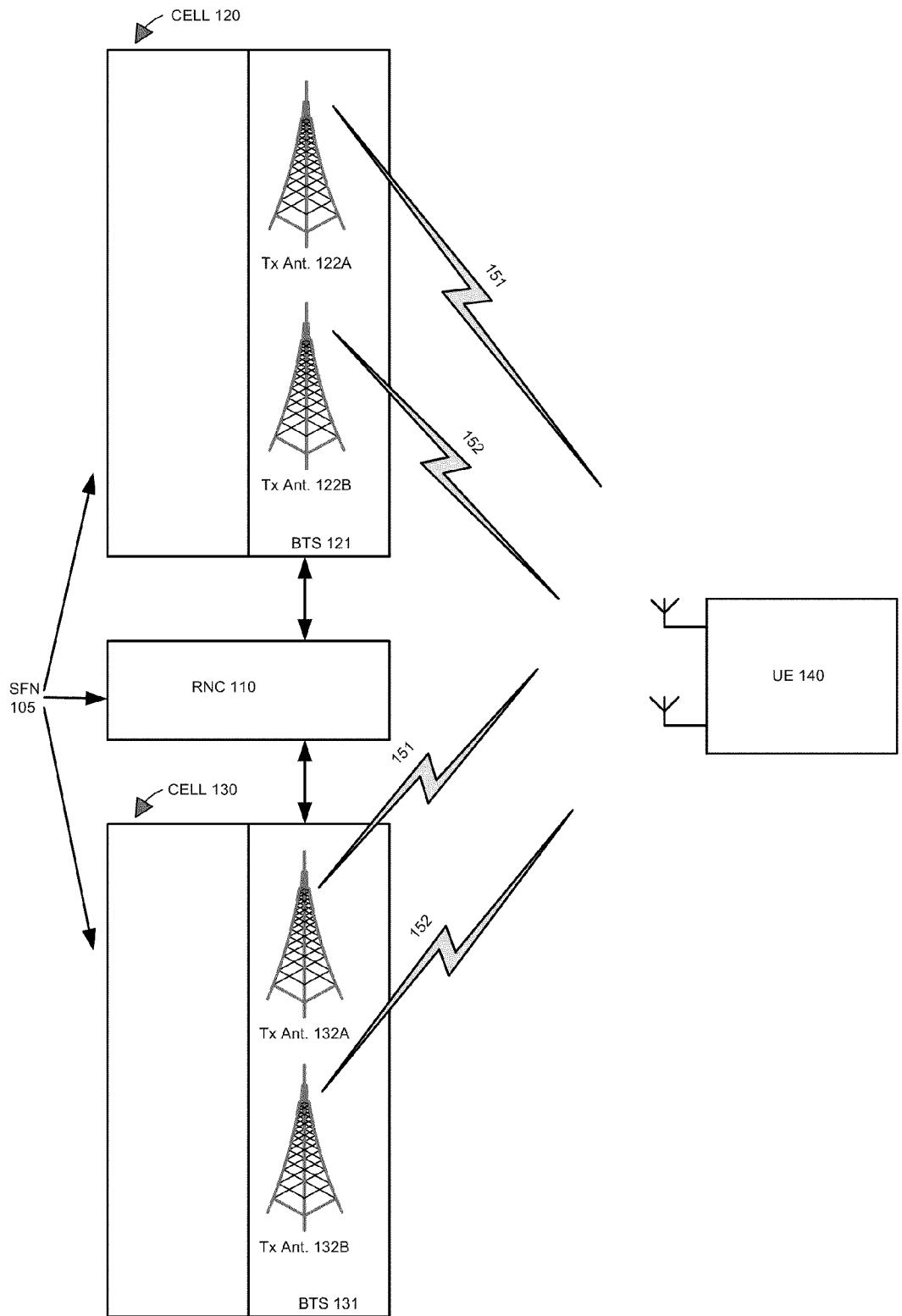
FIG. 1 is a high-level block diagram showing a cellular radio network transmitting to user equipment devices using Multiple-In Multiple-Out (MIMO) technique, in accordance with an embodiment of the present invention.

In this document, the words "embodiment," "variant," and similar expressions are used to refer to particular apparatus, process, or article of manufacture, and not necessarily to the same apparatus, process, or article of manufacture. Thus, "one embodiment" (or a similar expression) used in one place or context can refer to a particular apparatus, process, or article of manufacture; the same or a similar expression in a different place can refer to a different apparatus, process, or article of manufacture. The expression "alternative embodiment" and similar phrases are used to indicate one of a number of different possible embodiments. The number of possible embodiments is not necessarily limited to two or any other quantity.

The word "exemplary" is used herein to mean "serving as an example, instance, or illustration." Any embodiment described herein as "exemplary" is not necessarily to be construed as preferred or advantageous over other embodiments. All of the embodiments described in this description are exemplary embodiments provided to enable persons skilled in the art to make or use the invention, and not to limit the scope of legal protection afforded the invention, which is defined by the claims and their equivalents.

A "set" means one item or a plurality of items. Thus, a transmit antenna set may include one transmit antenna or a plurality of transmit antennae.

Base transceiver stations (BTSs) and base station controllers (BSCs) are parts of a network called "radio network," "RN," "access network," or "AN." A base station controller may also be referred to as a radio network controller or "RNC." A radio network may be a UTRAN or UMTS Terrestrial Radio Access Network. The radio network may transport data packets between multiple user equipment devices. The radio network may be further connected to additional networks outside the radio network, such as a corporate intranet, the Internet, or a conventional public switched telephone network ("PSTN"), and may transport data packets between each user equipment device and such outside networks.

"Single frequency network" or "SFN" is a radio network that operates several transmitters on the same frequency. To avoid or reduce interference, the several transmitters may be synchronized. Thus, the same signal is sent from the several transmitters. As will be described in more detail below, a single frequency network may also be configured to transmit multiple streams/flows of data on the same frequency, each data stream or flow being transmitted from a different set of transmitters of the network.

Given the same transmit power budget, multiple-input multiple-output (MIMO) technology enables increases in spectral efficiency of wireless communications. MIMO uses multiple spatially-diverse transmit antennae at a transmitting entity, and multiple spatially-diverse antennae at a receiver. Considering a basic example of two transmit antennae $N_{T,1}$ and $N_{T,2}$ and two receive antennae $N_{R,1}$ and $N_{R,2}$ four physical transmission channels are present: $CH_{1,1}$ between $N_{T,1}$ and $N_{R,1}$, $CH_{1,2}$ between $N_{T,1}$ and $N_{R,2}$, $CH_{2,1}$ between $N_{T,2}$ and $N_{R,1}$, and $CH_{2,2}$ between $N_{T,2}$ and $N_{R,2}$. (The notation $CH_{i,j}$ corresponds to a channel between a transmit antenna $N_{T,i}$ and a receive antenna $N_{R,j}$.) Each of these channels is subjected to channel conditions, such as delay, interference, noise, multipath/fading, dispersion, and distortion. Because of the spatial diversity of the receive and transmit antennae, the combined effects of these conditions are typically different for each of these channels.

In this document, a channel coefficient corresponding to a channel $CH_{i,j}$ is referred to as $h_{i,j}$. A channel matrix H representing all the channels between $N_T$ transmit antennae and $N_R$ receive antennae can then be defined as follows:

$$H = \begin{bmatrix} h_{1,1} & h_{1,2} & \cdots & h_{1,N_T} \\ h_{2,1} & h_{2,2} & \cdots & h_{2,N_T} \\ \cdots & \cdots & \cdots & \cdots \\ h_{N_R,1} & h_{N_R,2} & \cdots & h_{N_R,N_T} \end{bmatrix}$$

The channel coefficients $h_{i,j}$ can be estimated, making an estimate of the channel matrix H available. Note that each coefficient $h_{i,j}$ need not be a simple multiplier coefficient, but encompasses all factors affecting the associated channel.

Consider the simple case of two transmit antennae and two receive antennae, (i.e., $N_T=2$ and $N_R=2$), with a first transmit stream $TS_1$ (on a given frequency F) being transmitted from $N_{T,1}$ and a second stream $TS_2$ being transmitted from $N_{T,2}$. On the receiver side, a first receive stream $RS_1$ is received at $N_{R,1}$, and a second receive stream $RS_2$ is received at $N_{R,2}$. The two receive streams may be represented as follows:

$RS_1 = TS_1 * h_{1,1} + TS_2 * h_{2,1}$, and $RS_2 = TS_1 * h_{1,2} + TS_2 * h_{2,2}$.

Because estimates of the channel coefficients $h_{1,2}$, $h_{1,2}$, $h_{2,1}$, and $h_{2,2}$ are available, the two transmit streams $TS_1$ and $TS_2$ can be separated at the receiver. Linear algebra techniques similarly provide a way for separating multiple streams for higher numbers of transmit antennae, receive antennae, and data streams. This is explained in more detail in literature, including, for example, commonly-assigned U.S. patent application Ser. No. 11/009,200, Document No. 2005/0157805, entitled "Data Transmission With Spatial Spreading in a Mimo Communication System." See also commonly-assigned U.S. patent application Ser. No. 11/008,865, Document No. 2005/0175115, entitled "Spatial Spreading in a Multi-Antenna Communication System"; and commonly-assigned U.S. patent application Ser. No. 11/020,888, Document No. 2005/0195763, entitled "Pilot Transmission and Channel Estimation for MISO and MIMO Receivers in a Multi-Antenna System."

In the above discussion it was assumed that each transmit stream is broadcast from a single antenna. It is also possible to broadcast one stream from multiple transmit antennae. In this latter case, we can treat each channel coefficient $h_{i,j}$ as a coefficient of the transmission channel from the ith set of antennae that transmit a stream $TS_i$ to a receive antenna (or a set of receive antennae) j. The analytical treatment of this latter case is similar to the analytical treatment of the case of one transmit stream per transmit antenna.

Open loop MIMO techniques can be used as an additional option for increasing spectral efficiency of cellular SFN broadcasting and multicasting. Because MIMO uses multiple transmit antennae, one way to employ MIMO is to transmit multiple streams from multiple antennae of the same site or sector ("cell").

In a SFN deployment for broadcasting, the receive signal-to-noise ratio (SNR) at a UE can be very high; for the macro-cell link budget with 2800 meter inter-site distance, the SNR is typically higher than 14 dB for 95% of the users. Some system simulations show that, in a 1×1 deployment, for 95% coverage, the SFN spectral efficiency of E-MBMS is 1.2 bps/Hz. Given the presence of multiple transmit and receive antennae, such a high SNR makes it feasible to use open loop (without feedback) MIMO as an additional option for E-MBMS.

We will use this notation in the following discussion:
S=Number of transmit (Tx) streams;
N=Number of cells (sectors);
$N_T$=Number of transmit antennae per cell; and
$N_R$=Number of receive (Rx) antennae per cell.
Initially, let us assume that
S=min(N×$N_T$,$N_R$)>1.

FIG. 1 shows a cellular single frequency radio network 105 that includes a radio network controller 110, and cells 120 and 130. Each of these cells has a base transmitter station and two Tx antennae: the cell 120 has a BTS 121 and transmit antennae 122A and 122B, while the cell 130 has a BTS 131 and transmit antennae 132A and 132B. A UE 140 has two Rx antennae, 142A and 142B. Thus, S=min(N×N_T, N_R)=min(2× 2,2)=2>1. A specific open loop MIMO variant of this embodiment uses a generic cyclic or pseudo random antenna permutation (PRAP) scheme, wherein S streams with identical Modulation and Code Set (MCS) combinations are transmitted from each cell. Note that this makes the scheme similar to a variation of Horizontal Bell Labs Layered Space Time Code (H-BLAST). At a given time, the radio network 105 may transmit a first transmit stream 151 from the antennae 122A and 132A, and at the same time transmit a second transmit stream 152 from the antennae 122B and 132B.

Figure 2:
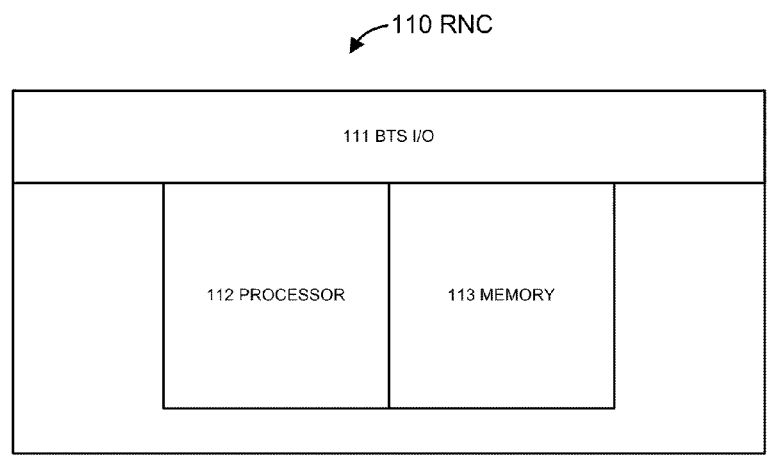
FIG. 2 is a high-level block diagram showing selected components of a radio network controller of the network of FIG. 1, in accordance with an embodiment of the present invention.

FIG. 2 illustrates selected components of an exemplary embodiment of the radio network controller 110. As shown in FIG. 2, the radio network controller 110 includes a BTS interface 111 to enable the RNC 110 to communicate with the BTSs 120 and 130, a processor 112, and a memory device 113 storing computer code instructions. The processor 112 is coupled to the memory device 113 and to the BTS interface 111, so that the processor 112 reads and executes the code stored in the memory device 113, configuring the BTS interface 111 to cause the BTSs 120 and 130 to communicate with the UE 140 and other UEs using the processes described throughout this document.

The radio network may include additional controllers.

Figure 3:
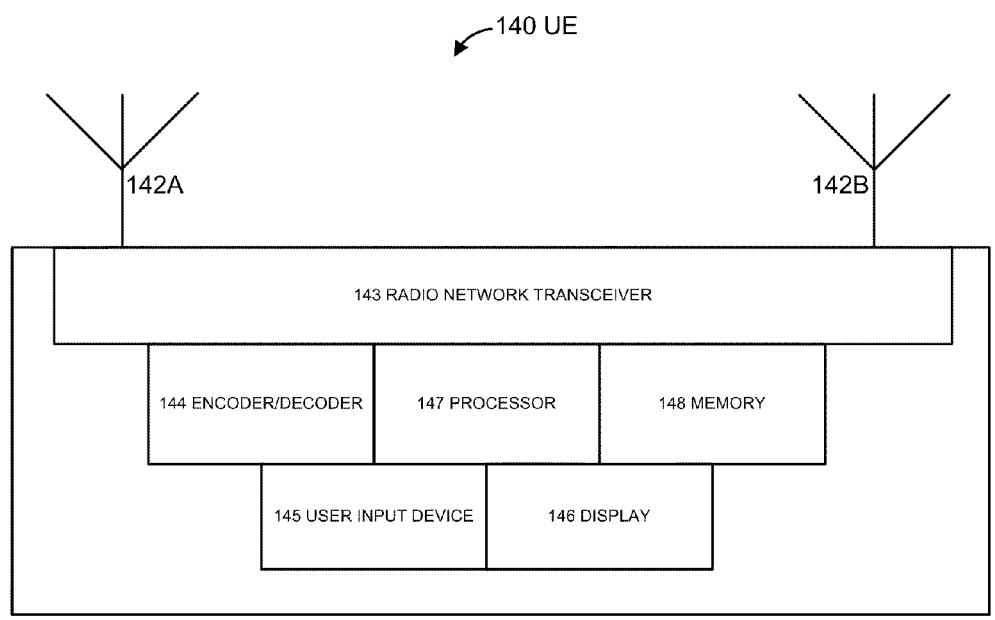
FIG. 3 is a high-level block diagram showing selected components of user equipment devices of FIG. 1, in accordance with an embodiment of the present invention.

FIG. 3 illustrates selected components of an exemplary embodiment of the UE 140. As shown in FIG. 3, the UE 140 includes receive antennae 142A and 142B, a radio network transceiver (receiver and transmitter) 143, an encoder/decoder block 144, a user input device (e.g., a keypad) 145, a display (e.g., an LCD screen) 146, a processor 147, and a memory device 148. The radio network transceiver 143, encoder and decoder block 144, user input device 145, and display 146 are configured by the processor 147 under control of the code stored in the memory device 148. The user equipment device 140 is configured to communicate with the radio network 105 over wireless communication links using a wireless cellular network transmission protocol, such as the cellular packet transmission protocols described above, and to execute processes described throughout this document.

Additional UEs may be in communication with the radio network 105.

The radio network may also include additional base transceiver stations.

The radio network 105 may transmit to the UE 140 using Orthogonal Frequency Division Multiplexing (OFDM). In each Orthogonal Frequency Division Multiplexing symbol (sub-carrier), each stream may be transmitted from the radio network 105 to the UE 140 on a separate antenna; further, the mapping of stream ID to transmit antenna ID is permuted in time, so that the Rx SNR for each stream is approximately identical.

Without any loss in generality, let us assume a relatively simple scenario for this case, wherein:

$$S=N_T.$$

To enable accurate channel estimation for each Tx-Rx antenna pair, the pilot sub-carriers are not re-used across Tx antennae. This is unlike data sub-carrier indices, which are re-used across all Tx antennae. Therefore, the following holds:

$$P_i \cap P_j = \phi \ \forall i \neq j,$$

wherein $P_i \in$ Set of pilot sub-carrier indices on antenna i.

The Rx symbol for a given OFDM symbol can be written as shown below:

$$Y[k] = \sum_{i=0}^{N-1} \sum_{j=0}^{N_T-1} H_{ij}[k] \cdot X_j[k] + V[k]$$

$$= \sum_{j=0}^{N_T-1} C_j[k] \cdot X_j[k] + V[k],$$

wherein
$X_j[k]$=Pre-IFFT Tx modulation symbol on antenna j on sub-carrier k,
$H_{ij}[k]$=Channel frequency response on sub-carrier k from cell i and antenna j,
$C_j[k]$=SFN channel frequency response on sub-carrier k and antenna j,
$Y[k]$=Post-FFT Rx symbol on sub-carrier k, and
$H_{ij}[k]$, $C_j[k]$, $Y[k]$=$N_R \times 1$ vectors.

Noting that the pilots from each antenna are orthogonal in frequency domain, we have this relationship:

$$Y[k]=C_j[k]+V_j[k] \ \forall k \in P_j.$$

The composite SFN channel frequency response for each Tx antenna can be estimated using, for example, a Minimum Mean Square Error (MMSE) or low complexity zero-forced Robust MMSE solution.

After channel estimation, stream separation and inter-stream interference suppression may be achieved using a MMSE filter. This can be written by invoking the Orthogonal Projection Lemma, as follows:

$$Y[k] = C_i[k] \cdot X_i[k] + \sum_{\substack{j=0 \\ j \neq i}}^{N_T-1} C_j[k] \cdot X_j + V[k]$$

$$\overline{X_i}[k] = C_i^H[k] \cdot \left[ \sum_{j=0}^{N_T-1} C_j[k] \cdot C_j^H[k] + \Lambda[k] \right]^{-1} \cdot Y[k],$$

wherein $\Lambda[k]=E\{V[k] \cdot V^H[k]\}$.

After stream separation at the receiver, each stream may be independently decoded, and then successively canceled out from all other streams. Cancellation steps may be iterated until all streams are decoded. The complexity of successive interference cancellation (SIC) depends on the number of streams.

On the receiving side, the receiver (such as the UE 140) receives a first signal using a first receive antenna, and a second signal using a second receive antenna. The first signal includes a first data stream transmitted through a first physical channel from a first transmit antenna or a first set of transmitter antennae, and a second data stream transmitted through a second physical channel from a second transmit antenna or a second set of transmit antennae. Similarly, the second signal includes the first data stream transmitted through a third physical channel, and the second data stream transmitted through a fourth physical channel. The four channels are estimated, for example, using pilot channels at the receiver, or at the radio network with data provided by the receiver. The first and second data streams can then be separated by the receiver to obtain a first separated data stream and a second separated data stream. After separation, the receiver attempts to decode first data in the first data stream and second data in the second data stream. If the first attempt to decode the data is not successful, the receiver may attempt to decode again after cancelling the interference based on the partial decoding obtained during the first attempt.

The first and the second data streams may be multicast or broadcast on common channel(s).

Because open loop broadcast and multicast transmissions are generally targeted to the worst case receiver, successive interference cancellation may be omitted if not all targeted UEs implement this step.

The discussion so far described an embodiment of FIG. 1 in which SFN spectral efficiency of an OFDM system is enhanced through MIMO technique, using multiple antennae at a cell, i.e., $S=N_T \geq 2$. The operation of the embodiment of FIG. 1 is not necessarily limited to the use of OFDM, but may employ other methods using MIMO.

As noted in the BACKGROUND section of this document, many cells (sectors) have a single transmit antenna. Adding transmit antennae to sites involves additional costs that operators would rather avoid. Consequently, in other embodiments we do not assume transmit diversity from a single cell. Instead, we assume that:

$S=\min(N^*N_T, N_R) > 1$, and $N_T = 1$ (i.e., one transmit antenna per cell).

In other words, we assign transmit antennae into sets, and transmit different data streams from different sets, one stream per one set of transmit antennae.

Here, the SNR may be lower than in the strict SNF operation where all cells transmit the same stream, because each stream may be transmitted from a partial subset of the network's cells. Nevertheless, it is likely that the SNR is still high enough to exploit spatial multiplexing gains. This is particularly so if the number of such sets/streams is small and, consequently, the number of transmit antennae in each set is relatively large, providing good coverage throughout the geographic area of interest.

In such arrangement a problem arises for those UEs that are situated in the interior of one of the cells, because these UEs have a high carrier-to-interference (C/I) ratio based on a strong signal from one cell only. Such UEs do not benefit from spatial multiplexing, but can rely on other multiplexing techniques, e.g., temporal multiplexing (TDM) and frequency multiplexing.

Figure 4:
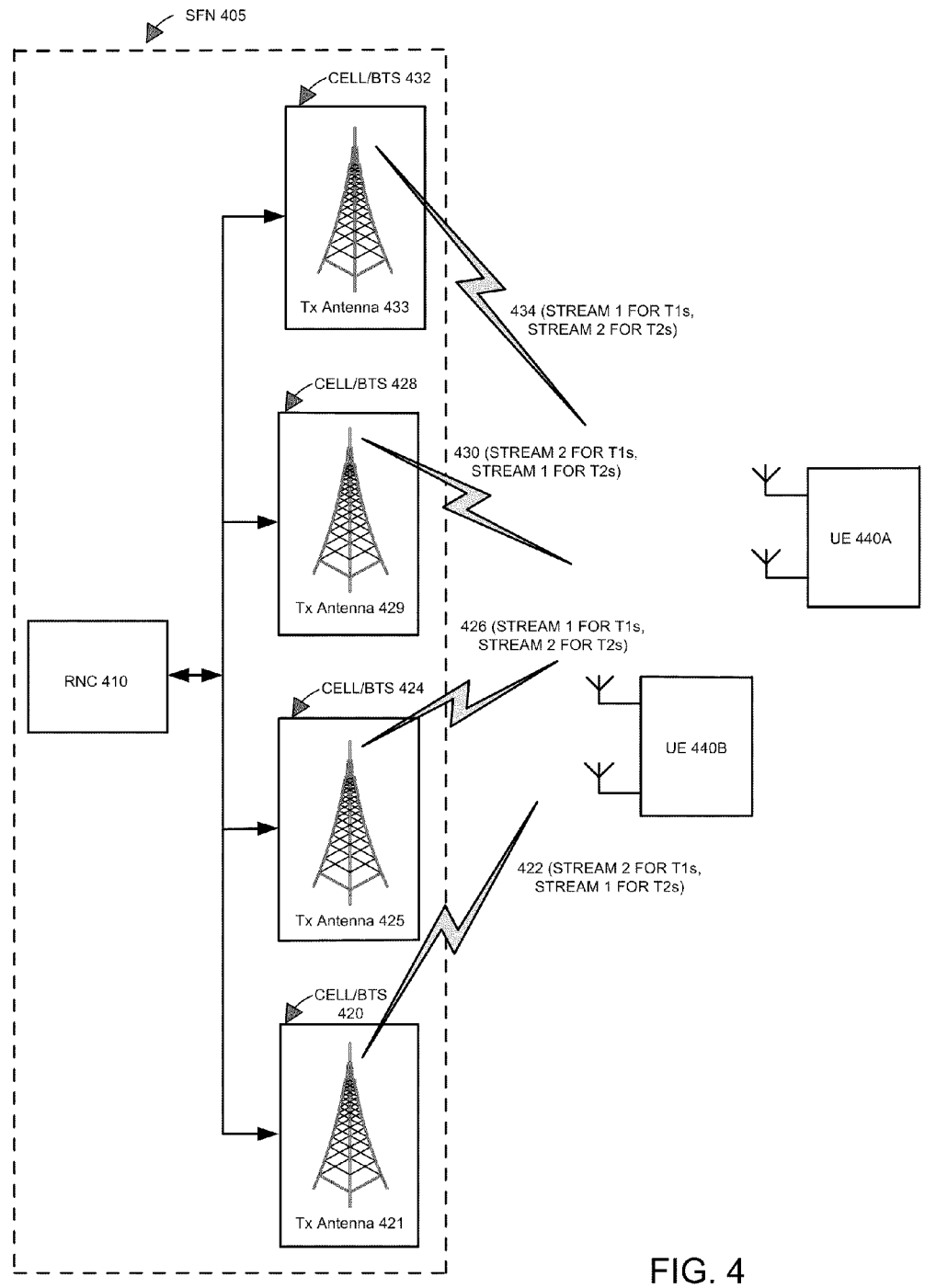
FIG. 4 is a high-level block diagram showing another cellular radio network transmitting to user equipment devices using MIMO and time division multiplexing/permuting, in accordance with an embodiment of the present invention.

FIG. 4 illustrates a single frequency radio network 405 using TDM and MIMO to broadcast or multicast to UEs 440A and 440B. The radio network 405 includes a radio network controller 410 and cells/BTSs 420, 424, 428, and 432. (Each cell is conterminous with a BTS in this embodiment, but this need not always be the case.)

The BTSs have respective transmit antennae 421, 425, 429, and 433. The structure of the radio network controller 410 may be similar or identical to the structure of the radio network controller 110. The structure of each of the UEs 440A/B may also be the same as or similar to the structure of the UE 140. Here, however, the radio network 405 and the UEs 440A/B are configured to communicate in accordance with the methods described below in relation to this embodiment.

In this embodiment, $S=N_R$, a generic PRAP or Code Reuse BLAST (CR-BLAST) scheme is used, and $N_R$ streams are transmitted from $$\frac{N}{N_R}$$

cells at any given time. Each of the $N_R$ streams thus corresponds to a set of transmit antennae in the associated set of cells. The mapping of streams to transmit antenna sets is permuted in time.

In this case, multiple streams are multiplexed in a time division multiplexed manner on a single transmit antenna per cell. In a two stream scenario, for example, half the symbols per slot may be dedicated to one stream, and the other half of the symbols are dedicated to the second stream. During a first period of time (T1), for example, a first stream of symbols is transmitted from a first set of transmit antennae that includes the transmit antennae 425 and 433 of the BTSs 424 and 432, while a second stream of symbols is transmitted from a second set of transmit antennae that includes transmit antennae 421 and 429 of the BTSs 420 and 428. During the following time period (T2), the first stream is transmitted from the second transmit set, while the second stream is transmitted from the first transmit set. The cycle is then repeated with the stream-antenna set mapping being switched again and again. This is illustrated in FIG. 5, which shows time periods T1-1 through T1-N during which the radio network transmits the first stream from the first set, and the second stream from the second set; similarly, the radio network transmits the first stream from the second set and the second stream from the first set during time periods T2-1 through T2-N.

Those UEs that are sufficiently far from each of the transmit antennae, such as the UE 440A, benefit from the spatial multiplexing gains resulting from the use of MIMO. In other words, the UE 440A receives both symbol streams. At the same time, the UEs in cell interiors, such as the UE 440B, benefit from temporal multiplexing and high C/I. In other words, the UE 440B may receive only one of the streams at a time, but with a relatively high C/I ratio and concomitantly high SNR, particularly in view of the proximity of the UE 440B to a transmit antenna.

After stream separation, each stream may be independently decoded, and then successively canceled out from all other streams. Cancellation steps may be iterated until all streams are decoded. The complexity of successive interference cancellation (SIC) depends on the number of streams.

The receiver of this embodiment may receive, during one or more first time periods, a first signal using a first receive antenna, and a second signal using a second receive antenna. The first signal includes (1) a first data stream transmitted through a first physical channel from a first transmit antenna or a first set of transmit antennae, and (2) a second data stream transmitted through a second physical channel from a second transmit antenna or a second set of transmit antennae. Similarly, the second signal includes the first data stream transmitted through a third physical channel, and the second data stream transmitted through a fourth physical channel. The first data stream carries first data during the first time period (s), and the second data stream carries second data during the first time period(s).

The four channels are estimated, for example, using pilot channels at the receiver. The first and second data streams can then be separated by the receiver to obtain a first separated data stream and a second separated data stream. After separation, the receiver attempts to decode the first data in the first data stream and the second data in the second data stream.

If the first attempt to decode the data is not successful, the receiver may attempt to decode again after cancelling the interference based on the partial decoding obtained during the first attempt.

The receiver may also attempt to decode the data from the signals received during subsequent time period or periods. Thus, if the first attempt to decode is not successful, the receiver may receive at the first antenna the first signal during one or more second time periods, and receive at the second antenna the second signal during the one or more second time periods. The receiver may separate the first and second data streams from at least one of the first signal and the second signal using some or all of the channel estimates, to obtain first separated data stream and second separated data stream of the second time periods. After the streams are separated, the receiver may again attempt to decode the first and the second data from the first and second separated data streams of the first and second time periods.

Recall that, because of the use of TDM, the first signal during the second periods includes the second data stream transmitted through the first physical channel and the first data stream transmitted through the second physical channel, and the second signal includes the second data stream transmitted through the third physical channel and the first data stream transmitted through the fourth physical channel. Recall also that the first data stream carries the first data during the second time periods, and the second data stream carries the second data during the second time periods. Thus, the data may be transmitted redundantly during the first and second time period(s).

The first and the second data streams may be multicast or broadcast on common channel(s).

Figure 6:
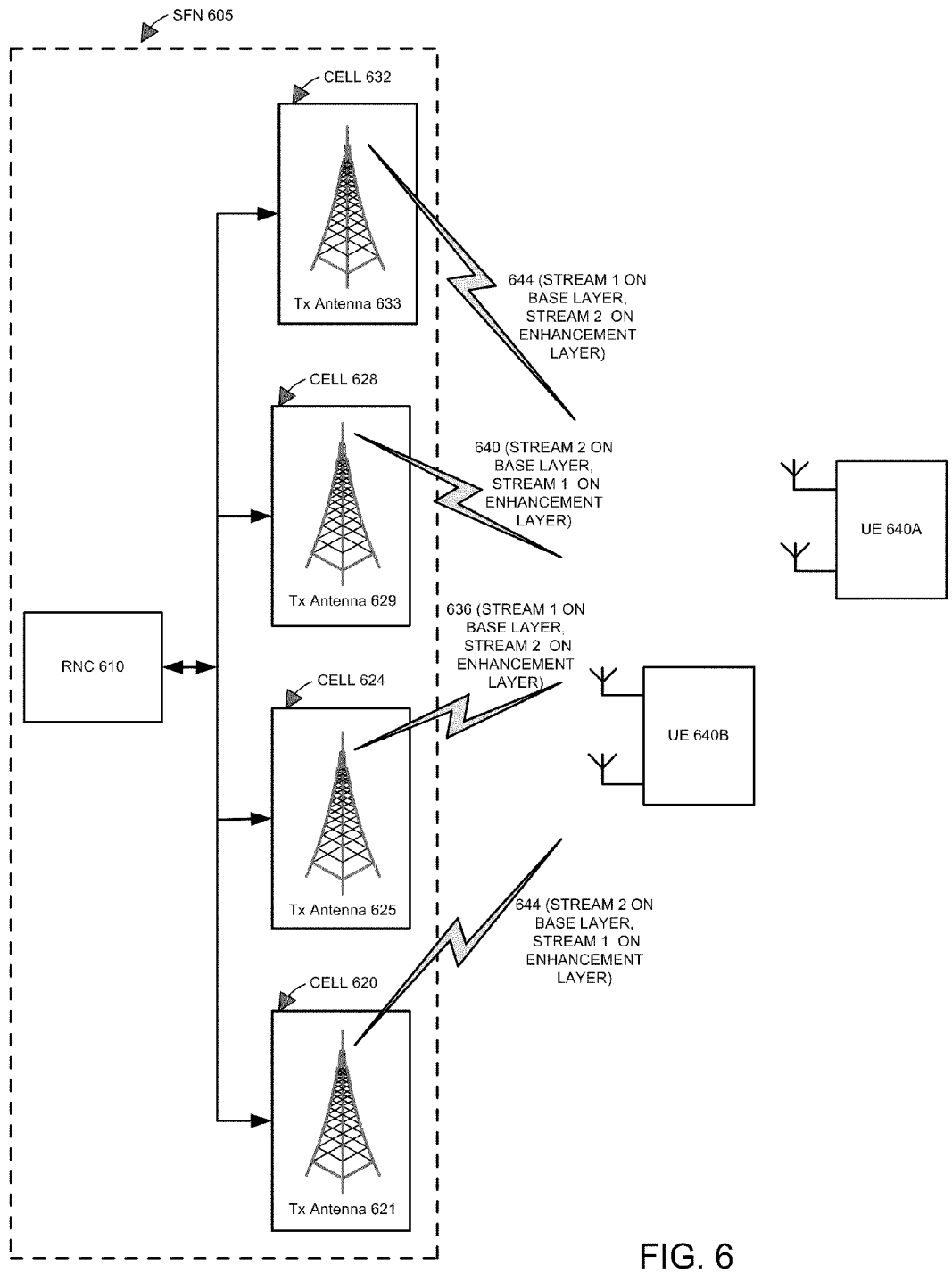
FIG. 6 is a high-level block diagram showing another cellular radio network transmitting to user equipment devices using MIMO and hierarchical modulation, in accordance with an embodiment of the present invention.

FIG. 6 illustrates a single frequency radio network 605 using Hierarchical

Modulation (HM) and MIMO to broadcast or multicast to UEs 640A and 640B. The radio network 605, which is similar to the network 405 of FIG. 4, includes a radio network controller 610 and cells/BTSs 620, 624, 628, and 632. The cells have respective transmit antennae 621, 625, 629, and 633. The structure of the radio network controller 610 may be similar or identical to the structure of the radio network controller 110, which is shown in FIG. 2. The structure of each of the UEs 640A/B may also be the same as or similar to the structure of the UE 140, which is shown in FIG. 3. The radio network and the UEs 640A/B are configured to communicate in accordance with the methods described below in relation to this embodiment.

Here, as in the network 405, $S=N_R$, a generic PRAP or Code Re-use BLAST (CR-BLAST) scheme is used, and $N_R$ streams are transmitted from cells at any given time. The streams are carried by hierarchically modulated signals.

In hierarchical modulation, a carrier is encoded with two data flows. Considering 64-QAM (Quadrature Amplitude Modulation), data is mapped so that there is a QPSK flow contained in the 64-QAM. This results in two data flows: the QPSK data flow and a 16-QAM data flow. The combined data rate of the two data flows may be the same as the data rate of the corresponding 64-QAM data flow. For the QPSK data flow, symbols are encoded onto a carrier so that different sections in the complex signal plane of the modulation constellation (such as the Q-I plane) represent different positions of the symbol alphabet bits. For example, the left part of the Q-I plane may correspond to the "1" value of the most significant bit of a symbol, and the right half of the plane may correspond to the "0" value of this bit. Similarly, the lower half of the plane may correspond to the "1" value of the second most significant bit position, and the top half of the plane may correspond to the "0" value of this bit. Thus, a symbol falling in the top left quadrant would represent "10" in the two most significant bit positions, a symbol in the top right quadrant would represent "00" in these positions, and symbols in the bottom left and bottom right quadrants would represent "11" and "01" values, respectively. Additional bits of the symbol corresponding to the 16-QAM data flow are determined by the symbol's position within the particular quadrant determined by the first two bits.

Note that the QPSK data flow is more robust than the 16-QAM data flow, meaning that the QPSK data flow may be decoded at lower SNR and lower C/I ratios of the signal. Spacing within the constellation may be varied to provide additional robustness to the QPSK data flow at the cost of the 16-QAM data flow. Thus, the more-robust BPSK data flow has a greater coverage than the less-robust 16-QAM data flow.

In this document, the more robust layer of a hierarchically modulated signal (such as the BPSK stream in the 64-QAM example above) will be referred to as the base layer; the less robust layer of the hierarchically modulated signal (such as the 16-QAM stream of the 64-QAM example) will be referred to as the enhancement layer.

Hierarchical modulation provides a mechanism for increasing transmission capacity. The capacity increase comes at the expense of reduced coverage for enhancement layer, while the base layer performance is improved.

In the SNF 605, the stream mapping may be permuted in time from base to enhancement layers. During the first time periods T1 of FIG. 7, for example, a first data stream S1 may be transmitted from the first set of antennae on the base layer of a first hierarchically modulated signal and, concurrently, from the second set of antennae on the enhancement layer of a second hierarchically modulated signal. During the second time periods T2 of FIG. 5, the first data stream may be transmitted from the first set of antennae on the enhancement layer of the first hierarchically modulated signal and, concurrently, from the second set of antennae on the base layer of the second hierarchically modulated signal. Thus, when the first stream is transmitted on the base layer of a set of antennae, the second layer is transmitted on the enhancement layer of the same set, and vice versa. In other words:

$$S_i \Leftrightarrow \begin{cases} \text{Base layer} & \forall \ i \bmod n = 0; \\ \text{Enhancement layer} & \forall \ i \bmod n = 1; \end{cases}$$

i=Stream ID; and
n=OFDM symbol index.

As in the TDM embodiment of FIG. 4, data in each stream may be redundantly transmitted during successive time periods.

A receiver (one of the UEs 640, for example) may be configured to receive at a first receive antenna a first receive signal that includes (1) the first signal component transmitted from a first transmit antenna (or a first set of transmit antennae) through a first physical channel, and (2) a second signal component transmitted from a second transmit antenna (or a second set of transmit antennae) through a second physical channel. The first signal component may include (1) a first base layer carrying a first data stream, and (2) a first enhancement layer carrying a second data stream; the second signal component may include (1) a second base layer carrying the second data stream, and (2) a second enhancement layer carrying the first data stream. The receiver may be further configured to receive at a second antenna a second signal that includes (1) a third signal component transmitted through a third physical channel, and (2) a fourth signal component transmitted through a fourth physical channel. The third signal component may include (1) a third base layer carrying the first data stream, and (2) a third enhancement layer carrying the second data stream; the fourth signal component may include (1) a fourth base layer carrying the second data stream, and (2) a fourth enhancement layer carrying the first data stream.

The first, second, third, and fourth physical channels may be estimated to obtain channel estimates for the channels. Channel estimation may be performed by the receiver and be based on pilot channels. After some or all the channel estimates become available, the receiver may separate the first and second signal components. After the signal separation, the receiver may attempt to decode the first data stream from the first base layer and the second data stream from the first enhancement layer.

The receiver may attempt to decode the second data stream from both the first enhancement layer and the second base layer. Alternatively, the receiver may estimate the quality of the first signal and, if the quality of the first signal (e.g., SNR) is higher than a predetermined measure, decode the second data stream from the first enhancement layer; if the quality of the first signal does not exceed the measure, the receiver may separate the third and fourth signal components using the channel estimates, and attempt decode the second data stream from the second base layer. The receiver may also estimate the quality of the second signal and, if the quality of the second signal is below a predetermined threshold, attempt to decode the second data stream from the first enhancement layer; if the quality of the second signal is not below the threshold, the receiver may separate the third and fourth signal components and attempt to decode the second data stream from the second base layer.

Interference Cancellation (IC) techniques may be used to cancel the interference from base layer to enhancement layer of the same signal.

In case multiple transmit antennae are present at the Node-B and cell-specific content needs to be transmitted, the system can switch to Space Time Transmit Diversity (STTD), or turn off the transmit diversity antennae. The first of these options may be simpler with no RF implications of dynamic switching on/off the transmit diversity antennae.

Although steps of the various methods have been described serially in this disclosure, some of these steps may be performed by separate elements in conjunction or in parallel, asynchronously or synchronously, in a pipelined manner, or otherwise. There is no particular requirement that the steps be performed in the same order in which this description lists them, except where explicitly so indicated, otherwise made clear from the context, or inherently required. Furthermore, not every illustrated step or communication message is necessarily required in every embodiment in accordance with the invention, while some steps or communication messages that have not been specifically illustrated may be desirable in some embodiments in accordance with the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware, software, or combination of hardware and software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of methods or algorithms described in connection with the embodiments disclosed herein may be embodied directly in hardware, in a software module executed by a processor, or in a combination of the two. A software module may reside in random access memory (RAM), flash memory, read only memory (ROM), erasable programmable read only memory (EPROM), electrically erasable programmable read only memory (EEPROM), registers, hard disk, removable disk, CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user equipment device. Alternatively, the processor and the storage medium may reside as discrete components in a user equipment device.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

What is claimed is:

1. A method for transmitting data in a cellular communications system with transmit spatial diversity, the method comprising:

selecting at least one antenna from each sector of a plurality of sectors to form a transmit antenna set of a plurality of L transmit antenna sets, wherein L is an integer greater than one;

assigning for a first period, each of a plurality of L data streams to a first different transmit antenna set of the plurality of L transmit antenna sets, resulting in a first distribution of data streams among transmit antenna sets;

concurrently transmitting to a plurality of receivers during the first period, each of the plurality of L data streams through transmit antennae of the plurality of L transmit antenna sets according to the first distribution so that transmit antennae of said each transmit antenna set transmit during the first period the data stream assigned to said each transmit antenna set for the at least one first period;

assigning for a second period, each of the plurality of L data streams to a second different transmit antenna set of the plurality of L transmit antenna sets, resulting in a second distribution of data streams among transmit antenna sets, wherein the second distribution is different from the first distribution; and concurrently transmitting to the plurality of receivers during the second period, each of the plurality of L data streams through the transmit antennae of the plurality of L transmit antenna sets according to the second distribution so that transmit antennae of said each transmit antenna set transmit during the second period the data stream assigned to said each transmit antenna set for the second period.

2. The method of claim 1, further comprising:
modulating each of the plurality of L data streams with identical modulation and code set (MCS) combinations prior to transmission.

3. The method of claim 1, wherein:
L is equal to two;
the first period comprises a plurality of first subperiods;
the second period comprises a plurality of second subperiods; and
during a first time duration, the plurality of first subperiods are interleaved with the plurality of second subperiods.

4. The method of claim 3, wherein a first data stream and a second data stream of the plurality of L data streams are multicast or broadcast on at least one common channel.

5. The method of claim 1, wherein the cellular communications system supports single frequency network (SFN) operation and orthogonal frequency division multiplexing (OFDM) transmissions.

6. The method of claim 5, wherein each transmit antenna of the plurality of L transmit antenna sets uses a distinct pilot sub-carrier.

7. A method for receiving data in a cellular communications system with transmit spatial diversity, the method comprising:
receiving a plurality of signals comprising a plurality of L data streams transmitted from a plurality of L transmit antenna sets based on a distribution of data streams among transmit antenna sets, wherein each of the plurality of L data streams has been concurrently transmitted by a first different transmit antenna set comprising a first distribution of transmit antennae from the plurality of L transmit antenna sets so that transmit antennae of said each transmit antenna set transmit during a first period the data stream assigned to said each transmit antenna set for the first period and concurrently transmitted by a second different transmit antenna set comprising a second distribution of transmit antennae from the plurality of L transmit antenna sets so that transmit antennae of said each transmit antenna set transmit during a second period the data stream assigned to said each transmit antenna set for the second period;

deriving a channel estimate for each of the plurality of signals to obtain channel estimates; and
separating each of the plurality of L data streams from the plurality of signals using the channel estimates to generate a plurality of separated L data streams.

8. The method of claim 7, wherein the channel estimates comprise a composite channel frequency response for each transmit antenna of the plurality of L transmit antenna sets, and is derived using a minimum mean square error (MMSE) or low-complexity zero-forced robust MMSE solution.

9. The method of claim 7, further comprising:
decoding each of the plurality of separated L data streams.

10. The method of claim 9, further comprising:
performing successive interference cancellation (SIC) on the plurality of separated L data streams to generate a plurality of interference-cancelled separated L data streams if the decoding is unsuccessful; and
further decoding each of the plurality of interference-cancelled separated L data streams.

11. An apparatus for transmitting data in a cellular communications system with transmit spatial diversity, the apparatus comprising:
means for selecting at least one antenna from each sector of a plurality of sectors to form a transmit antenna set of a plurality of L transmit antenna sets, wherein L is an integer greater than one;
means for assigning for a first period, each of a plurality of L data streams to a first different transmit antenna set of the plurality of L transmit antenna sets, resulting in a first distribution of data streams among transmit antenna sets;
means for concurrently transmitting to a plurality of receivers during the first period, each of the plurality of L data streams from the first through transmit antennae of the plurality of L transmit antenna sets according to the first distribution so that transmit antennae of said each transmit antenna set transmit during the first period the data stream assigned to said each transmit antenna set for the at least one first period;
means for assigning for a second period, each of the plurality of L data streams to a second different transmit antenna set of the plurality of L transmit antenna sets, resulting in a second distribution of data streams among transmit antenna sets, wherein the second distribution is different from the first distribution; and
means for concurrently transmitting to the plurality of receivers during the second period, each of the plurality of L data streams through the transmit antennae of the plurality of L transmit antenna sets according to the second distribution so that transmit antennae of said each transmit antenna set transmit during the second period the data stream assigned to said each transmit antenna set for the second period.

12. The apparatus of claim 11, further comprising:
means for modulating each of the plurality of L data streams with identical modulation and code set (MCS) combinations prior to transmission.

13. The apparatus of claim 11, wherein:
L is equal to two;
the first period comprises a plurality of first subperiods;
the second period comprises a plurality of second subperiods; and
during a first time duration, the plurality of first subperiods are interleaved with the plurality of second subperiods.

14. The apparatus of claim 13, wherein a first data stream and a second data stream of the plurality of L data streams are multicast or broadcast on at least one common channel.

15. The apparatus of claim 11, wherein the cellular communications system supports single frequency network (SFN) operation and orthogonal frequency division multiplexing (OFDM) transmissions.

16. The apparatus of claim 15, wherein each transmit antenna of the plurality of L transmit antenna sets uses a distinct pilot sub-carrier.

17. An apparatus for receiving data in a cellular communications system with transmit spatial diversity, the apparatus comprising:
    means for receiving a plurality of signals comprising a plurality of L data streams transmitted from a plurality of L transmit antenna sets based on a distribution of data streams among transmit antenna sets, wherein each of the plurality of L data streams has been concurrently transmitted by a first different transmit antenna set comprising a first distribution of transmit antennae from the plurality of L transmit antenna sets so that transmit antennae of said each transmit antenna set transmit during a first period the data stream assigned to said each transmit antenna set for the first period and concurrently transmitted by a second different transmit antenna set comprising a second distribution of transmit antennae from the plurality of L transmit antenna sets so that transmit antennae of said each transmit antenna set transmit during a second period the data stream assigned to said each transmit antenna set for the second period;
    means for deriving a channel estimate for each of the plurality of signals to obtain channel estimates; and
    means for separating each of the plurality of L data streams from the plurality of signals using the channel estimates to generate a plurality of separated L data streams.

18. The apparatus of claim 17, wherein the channel estimates comprise a composite channel frequency response for each transmit antenna of the plurality of L transmit antenna sets, and is derived using a minimum mean square error (MMSE) or low-complexity zero-forced robust MMSE solution.

19. The apparatus of claim 17, further comprising:
    means for decoding each of the plurality of separated L data streams.

20. The apparatus of claim 19, further comprising:
    means for performing successive interference cancellation (SIC) on the plurality of separated L data streams to generate a plurality of interference-cancelled separated L data streams if the decoding is unsuccessful; and
    means for further decoding each of the plurality of interference-cancelled separated L data streams.

21. An apparatus for transmitting data in a cellular communications system with transmit spatial diversity, the apparatus comprising:
    a processor configured for:
    selecting at least one antenna from each sector of a plurality of sectors to form a transmit antenna set of a plurality of L transmit antenna sets, wherein L is an integer greater than one;
    assigning for a first period, each of a plurality of L data streams to a first different transmit antenna set of the plurality of L transmit antenna sets, resulting in a first distribution of data streams among transmit antenna sets;
    concurrently transmitting to a plurality of receivers during the first period, each of the plurality of L data streams through transmit antennae of the plurality of L transmit antenna sets according to the first distribution so that transmit antennae of said each transmit antenna set transmit during the first period the data stream assigned to said each transmit antenna set for the at least one first period;
    assigning for a second period, each of the plurality of L data streams to a second different transmit antenna set of the plurality of L transmit antenna sets, resulting in a second distribution of data streams among transmit antenna sets, wherein the second distribution is different from the first distribution; and
    concurrently transmitting to the plurality of receivers during the second period, each of the plurality of L data streams through the transmit antennae of the plurality of L transmit antenna sets according to the second distribution so that transmit antennae of said each transmit antenna set transmit during the second period the data stream assigned to said each transmit antenna set for the second period; and
    a memory coupled to the processor.

22. The apparatus of claim 21, wherein the processor is further configured for:
    modulating each of the plurality of L data streams with identical modulation and code set (MCS) combinations prior to transmission.

23. The apparatus of claim 21, wherein:
    L is equal to two;
    the first period comprises a plurality of first subperiods;
    the second period comprises a plurality of second subperiods; and
    during a first time duration, the plurality of first subperiods are interleaved with the plurality of second subperiods.

24. The apparatus of claim 23, wherein a first data stream and a second data stream of the plurality of L data streams are multicast or broadcast on at least one common channel.

25. The apparatus of claim 21, wherein the cellular communications system supports single frequency network (SFN) operation and orthogonal frequency division multiplexing (OFDM) transmissions.

26. The apparatus of claim 25, wherein each transmit antenna of the plurality of L transmit antenna sets uses a distinct pilot sub-carrier.

27. An apparatus for receiving data in a cellular communications system with transmit spatial diversity, the apparatus comprising:
    a radio network transceiver for receiving a plurality of signals comprising a plurality of L data streams transmitted from a plurality of L transmit antenna sets based on a distribution of data streams among transmit antenna sets, wherein each of the plurality of L data streams has been concurrently transmitted by a first different transmit antenna set comprising a first distribution of transmit antennae from the plurality of L transmit antenna sets so that transmit antennae of said each transmit antenna set transmit during a first period the data stream assigned to said each transmit antenna set for the first period and concurrently transmitted by a second different transmit antenna set comprising a second distribution of transmit antennae from the plurality of L transmit antenna sets so that transmit antennae of said each transmit antenna set transmit during a second period the data stream assigned to said each transmit antenna set for the second period; and
    a processor for deriving a channel estimate for each of the plurality of signals to obtain channel estimates, and for separating each of the plurality of L data streams from the plurality of signals using the channel estimates to generate a plurality of separated L data streams.

28. The apparatus of claim 27, wherein the channel estimates comprise a composite channel frequency response for each transmit antenna of the plurality of L transmit antenna sets, and is derived using a minimum mean square error (MMSE) or low-complexity zero-forced robust MMSE solution.

29. The apparatus of claim 27, further comprising:
a decoder for decoding each of the plurality of separated L data streams.

30. The apparatus of claim 29, wherein
the processor is further configured for performing successive interference cancellation (SIC) on the plurality of separated L data streams to generate a plurality of interference-cancelled separated L data streams if the decoding is unsuccessful; and wherein
the decoder is further configured for further decoding each of the plurality of interference-cancelled separated L data streams.

31. A computer-readable medium storing a computer program, wherein execution of the computer program is for:
selecting at least one antenna from each sector of a plurality of sectors to form a transmit antenna set of a plurality of L transmit antenna sets, wherein L is an integer greater than one;
assigning for a first period, each of a plurality of L data streams to a first different transmit antenna set of the plurality of L transmit antenna sets, resulting in a first distribution of data streams among transmit antenna sets, wherein each of the plurality of L data streams are partitions of the data;
concurrently transmitting to a plurality of receivers during the first period, each of the plurality of L data streams through transmit antennae of the plurality of L transmit antenna sets according to the first distribution so that transmit antennae of said each transmit antenna set transmit during the first period the data stream assigned to said each transmit antenna set for the at least one first period;
assigning for a second period, each of the plurality of L data streams to a second different transmit antenna set of the plurality of L transmit antenna sets, resulting in a second distribution of data streams among transmit antenna sets, wherein the second distribution is different from the first distribution; and
concurrently transmitting to the plurality of receivers during the second period, each of the plurality of L data streams through the transmit antennae of the plurality of L transmit antenna sets according to the second distribution so that transmit antennae of said each transmit antenna set transmit during the second period the data stream assigned to said each transmit antenna set for the second period.

32. The computer-readable medium of claim 31, wherein execution of the computer program is also for:
modulating each of the plurality of L data streams with identical modulation and code set (MCS) combinations prior to transmission.

33. The computer-readable medium of claim 31, wherein:
L is equal to two;
the first period comprises a plurality of first subperiods;
the second period comprises a plurality of second subperiods; and
during a first time duration, the plurality of first subperiods are interleaved with the plurality of second subperiods.

34. The computer-readable medium of claim 33, wherein a first data stream and a second data stream of the plurality of L data streams are multicast or broadcast on at least one common channel.

35. The computer-readable medium of claim 31, wherein the cellular communications system supports single frequency network (SFN) operation and orthogonal frequency division multiplexing (OFDM) transmissions.

36. The computer-readable medium of claim 35, wherein each transmit antenna of the plurality of L transmit antenna sets uses a distinct pilot sub-carrier.

37. A computer-readable medium storing a computer program, wherein execution of the computer program is for:
receiving a plurality of signals comprising a plurality of L data streams transmitted from a plurality of L transmit antenna sets based on a distribution of data streams among transmit antenna sets, wherein each of the plurality of L data streams has been concurrently transmitted by a first different transmit antenna set comprising a first distribution of transmit antennae from the plurality of L transmit antenna sets so that transmit antennae of said each transmit antenna set transmit during a first period the data stream assigned to said each transmit antenna set for the first period and concurrently transmitted by a second different transmit antenna set comprising a second distribution of transmit antennae from the plurality of L transmit antenna sets so that transmit antennae of said each transmit antenna set transmit during a second period the data stream assigned to said each transmit antenna set for the second period;
deriving a channel estimate for each of the plurality of signals to obtain channel estimates; and
separating each of the plurality of L data streams from the plurality of signals using the channel estimates to generate a plurality of separated L data streams.

38. The computer-readable medium of claim 37, wherein the channel estimates comprise a composite channel frequency response for each transmit antenna of the plurality of L transmit antenna sets, and is derived using a minimum mean square error (MMSE) or low-complexity zero-forced robust MMSE solution.

39. The computer-readable medium of claim 37, wherein execution of the computer program is also for:
decoding each of the plurality of separated L data streams.

40. The computer-readable medium of claim 39, wherein execution of the computer program is also for:
performing successive interference cancellation (SIC) on the plurality of separated L data streams to generate a plurality of interference-cancelled separated L data streams if the decoding is unsuccessful; and
further decoding each of the plurality of interference-cancelled separated L data streams.

* * * * *